D. A. THORNHILL.
LUBRICATOR.
APPLICATION FILED MAY 4, 1917. RENEWED JAN. 8, 1919.
1,294,728.
Patented Feb. 18, 1919.
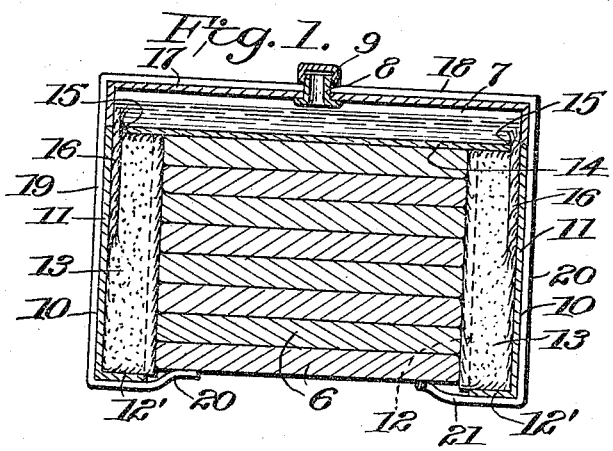
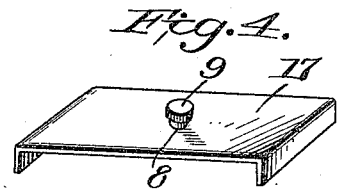
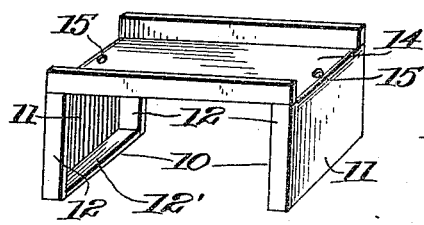
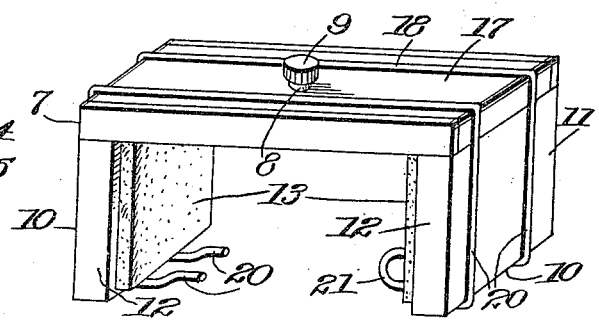
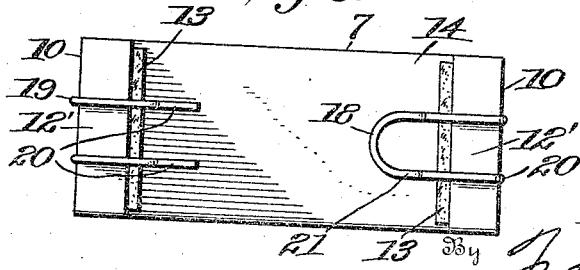
Inventor,
D. A. Thornhill,
By Frank Gulle
Attorney.

UNITED STATES PATENT OFFICE.

DON A. THORNHILL, OF SYRACUSE, NEW YORK.

LUBRICATOR.

1,294,728. Specification of Letters Patent. Patented Feb. 18, 1919.

Application filed May 4, 1917, Serial No. 166,326. Renewed January 8, 1919. Serial No. 270,247.

*To all whom it may concern:*

Be it known that I, DON A. THORNHILL, a citizen of the United States, residing at Syracuse, in the county of Onondaga and State of New York, have invented certain new and useful Improvements in Lubricators, of which the following is a specification.

My invention relates to a lubricator particularly for use with the laminated bolster springs of automobiles or other vehicles to specifically apply the lubricant between the springs to render their action easier and avoid noise during their movement relatively during travel of the vehicle.

I particularly aim to provide a construction wherein the lubricant is fed by capillary action and without waste, to provide a novel improved and more efficient structure; to provide one which may be removably attached to the springs and which will not interfere with the movement thereof and to provide one having a reservoir to straddle the spring, with depending applicators, containers and yieldable clip means to engage the springs. Additional objects and advantages will be specifically pointed out in the following description, to be considered with accompanying drawings, wherein:—

Figure 1 is a view showing the spring in transverse section with the improvements thereon and in longitudinal section;

Fig. 2 is a perspective view of the improvements;

Fig. 3 is a bottom view of the improvements;

Figs. 4 and 5 are perspective views of the main sections of material from which the lubricator is made.

Referring to the drawings, 6 represent usual laminated bolster springs of an automobile or other vehicle, which in use slide on each other under strain. The remainder of the illustrated parts constitute my improvements. A lubricant reservoir 7 is provided with rests directly on the uppermost spring. The lubricant may be in a liquid state as illustrated in Fig. 1 and supplied to the reservoir through a filling nipple 8 normally closed by a cap 9 screw-threaded thereto. Depending from the reservoir at each end thereof, is a side or container 10. These sides are disposed on opposite sides of the spring structure and each comprises a main flange 11 and inwardly extending flanges 12 and $12^1$. Thus the sides are in effect pans. Removable lubricant applicators 13 snugly fit the sides and are held therein by friction with the walls 11, 12 and $12^1$ and the bottom wall of the reservoir. These applicators lie contiguous with the sides of the springs and are made of absorbent or sponge material.

In the bottom flange of the reservoir 7, which may be designated 14, holes 15 are provided through which pass absorbent feeds or wicks 16 which extend into the reservoir and which touch the applicators. As a result, the lubricant is conveyed by capillarity from the reservoir through the feeds or wicks to the applicators and then between the springs. Wasting of the lubricant will not occur as the lubricant will only leave the applicators when a deficit occurs on the springs.

While the structure may be made in any suitable manner, yet I aim to make the reservoir and sides 10 from the two parts shown in Figs. 4 and 5. As Fig. 5 illustrates, the sides 10 are made integral with the bottom flange 14 of the reservoir 7 and the two side flanges of the reservoir are integral with said bottom flange. The other part may comprise the top of the reservoir 8, which we may call 17, with integral depending ends to fit between the sides of the other part. The ends are soldered to the sides and the bottom of the reservoir while the top or cover may be soldered to the side flanges. Flanges 11 at their upper ends abut the bottom 14 and limit inward bending of the sides 10 and hence the soldering of these flanges to the bottom is unnecessary. However the sides 10 spring inwardly from their one-point connection with the bottom 14 so that the applicators will grip the sides of the springs.

The article may be used with springs of different widths by employing applicators of different thicknesses.

In use the reservoir and sides 10 removably straddle the spring as illustrated in Fig. 1 and is limited against movement except upwardly. Therefore, I prefer to employ a means to complete the fastening to the spring. As a result I solder a wire strand or spring 18 to the top of the reservoir. The wire is U-shaped and the ends extend downwardly and against the exterior of the sides 10 at 19 and 20 preferably not being soldered thereto and then the ends extend freely inwardly and upwardly at 21 and 22 to yieldingly engage the lower surface of the lowermost spring 6. It will be realized that the wire or spring 18 may be pulled or sprung away from the sides 10 to move the ends 21 and 22 out of engagement with the springs in removing the lubricator. Said ends are tensioned to yield from their points of connection to reservoir and to normally clip into engagement with the springs.

Changes may be resorted to within the spirit and scope of the invention.

I claim:

1. A lubricator having a reservoir for springs, a side bent downwardly therefrom having an inwardly extending wall underlapping the reservoir to limit inward bending of the side, a fastening means mounted upon the reservoir and extending downwardly to prevent undue outward bending of said flanges in the opposite direction, a cover section, said fastening means also securing said cover section in place, a lubricant applicator located in the side flanges, and means of communication between the reservoir and the said applicator.

2. A lubricator for springs having a reservoir, a side bent downwardly from the bottom thereof having flanges underlapping the bottom to limit inward bending of the sides, a cover section for the reservoir having depending end flanges to rest on the reservoir, and means to secure the reservoir and cover section together and to the spring.

3. A lubricator for springs having a reservoir, sides integral with and depending from the bottom of the reservoir, said sides having inwardly extending walls to engage the bottom of the reservoir to limit inward bending of the sides, said sides being yieldable, applicators in the sides, said bottom having holes therein, feeds passing through said holes from the reservoir to the applicators, side flanges extending upwardly and integrally from the bottom of the reservoir, a cover for the reservoir, ends flanges extending downwardly from the cover, means to join the cover, ends, sides and bottom together, a spring fastened to the cover, said spring having free outwardly yieldable portions opposite the sides, and portions extending inwardly beyond the sides to removably secure the lubricator in place.

4. A lubricator having a reservoir for springs, a cover section for the reservoir, a lubricant applicator, means to mount said applicator in communication with the reservoir, and means to dually function to fasten the cover section to the reservoir and to fasten the device as an entirety to the spring.

In testimony whereof I affix my signature in the presence of two witnesses.

DON A. THORNHILL.

Witnesses:
D. V. BROWNE,
G. J. CHILDS.

Copies of this patent may be obtained for five cents each, by addressing the "Commissioner of Patents, Washington, D. C."